(12) United States Patent
McKibben et al.

(10) Patent No.: US 10,308,161 B2
(45) Date of Patent: *Jun. 4, 2019

(54) INTERMODAL CHASSIS

(71) Applicant: Fleet Concepts, Inc., Hillsboro, OR (US)

(72) Inventors: Keith McKibben, Hillsboro, OR (US); Mark Allen Woods, Kingsburg, CA (US)

(73) Assignee: Fleet Concepts, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,002

(22) Filed: Feb. 22, 2018

(65) Prior Publication Data

US 2018/0194265 A1    Jul. 12, 2018

Related U.S. Application Data

(63) Continuation of application No. 14/923,440, filed on Oct. 27, 2015, now Pat. No. 9,908,453.

(60) Provisional application No. 62/069,147, filed on Oct. 27, 2014.

(51) Int. Cl.
| | |
|---|---|
| *B60G 9/00* | (2006.01) |
| *B60P 3/40* | (2006.01) |
| *B62D 21/20* | (2006.01) |
| *B62D 53/06* | (2006.01) |

(52) U.S. Cl.
CPC ............... *B60P 3/40* (2013.01); *B60G 9/003* (2013.01); *B62D 21/20* (2013.01); *B62D 53/061* (2013.01); *B60G 2300/042* (2013.01); *B60G 2300/40* (2013.01)

(58) Field of Classification Search
CPC ......... B60P 3/40; B62D 53/061; B62D 53/08; B62D 21/20
See application file for complete search history.

(56) References Cited

U.S. PATENT DOCUMENTS

| | | | | |
|---|---|---|---|---|
| 2,722,433 | A * | 11/1955 | Shinn ................... | B62D 53/061 280/417.1 |
| 2,789,714 | A * | 4/1957 | Norris .................. | B62D 53/065 280/441.2 |
| 3,587,890 | A * | 6/1971 | Hyland ................. | E04G 21/161 238/13 |

(Continued)

*Primary Examiner* — Joseph M Rocca
*Assistant Examiner* — Michael R Stabley
(74) *Attorney, Agent, or Firm* — J. Douglas Wells

(57) ABSTRACT

An intermodal chassis for highway transportation of shipping containers, the chassis having a forward axle and a rear axle, and incorporating an air bag suspension that automatically deflate the air bags when the brakes are locked, preventing damage when loading a container onto the chassis. Large 53 foot long box/high cube type shipping containers may be loaded along their entire length with the chassis having a rear axle positioned under the chassis frame so that the kingpin-to-rear-axle length is no more than 40 feet, and a forward axle positioned under the frame between the gooseneck and the rear axle so that a forward-to-rear-axle length is at least 12 feet. Other features include self-scaling and load-leveling, and other weight savings include use of smaller sized aluminum wheels.

8 Claims, 16 Drawing Sheets

(56) References Cited

U.S. PATENT DOCUMENTS

| | | | | |
|---|---|---|---|---|
| 3,856,344 A * | 12/1974 | Loeber | ............... | B62D 25/2054 105/422 |
| 3,892,423 A * | 7/1975 | Smith | ................. | B62D 53/061 280/423.1 |
| 4,511,303 A * | 4/1985 | O'Neill | ................... | B60P 1/025 414/458 |
| 4,806,065 A * | 2/1989 | Holt | ..................... | B62D 53/065 280/425.2 |
| 4,836,735 A * | 6/1989 | Dennehy, Jr. | ......... | B60P 1/6427 280/149.2 |
| 4,938,524 A * | 7/1990 | Straub | ................... | B61D 17/10 280/423.1 |
| 5,088,875 A * | 2/1992 | Galbreath | ............... | B60P 1/6454 280/405.1 |
| 5,193,836 A * | 3/1993 | Hastings | ............... | B60P 1/6481 280/400 |
| 5,215,426 A * | 6/1993 | Bills, Jr. | .................... | B60P 1/43 414/537 |
| 5,322,314 A * | 6/1994 | Blum | .................... | B62D 21/20 280/400 |
| 5,398,956 A * | 3/1995 | Yurgevich | .............. | B60P 1/6481 280/425.2 |
| 5,507,514 A * | 4/1996 | Jacques | ............... | B62D 53/067 280/407.1 |
| 5,794,960 A * | 8/1998 | Sill | ...................... | B62D 53/061 280/425.2 |
| 6,478,324 B1 * | 11/2002 | Yurgevich | ............. | B62D 21/09 280/425.2 |
| 6,773,023 B2 * | 8/2004 | Athans | ................... | B62D 53/06 280/433 |
| 6,969,104 B2 * | 11/2005 | Green | .................. | B60P 1/6481 280/656 |
| 7,293,781 B2 * | 11/2007 | Power | ................... | B60G 9/003 280/124.116 |
| 7,309,205 B2 * | 12/2007 | McCrory | .............. | B65G 67/42 414/369 |
| 7,478,865 B2 * | 1/2009 | Klein | .................... | B62D 33/04 296/182.1 |
| 7,572,988 B1 * | 8/2009 | Morton | ................. | G01G 19/10 177/137 |
| 7,896,055 B2 * | 3/2011 | Kliskey | .................. | B60C 25/04 157/1.1 |
| 7,946,644 B1 * | 5/2011 | Foster | ................. | B62D 33/042 296/186.1 |
| 8,662,525 B1 * | 3/2014 | Dierks | ..................... | B62B 1/00 280/142 |
| 8,684,447 B2 * | 4/2014 | Henderson | ........... | B62D 35/001 296/180.4 |
| 2011/0272965 A1 * | 11/2011 | Henderson | ........... | B62D 35/001 296/180.4 |
| 2012/0070262 A1 * | 3/2012 | Lanning | ................ | B30B 9/3032 414/787 |
| 2012/0248729 A1 * | 10/2012 | Horton | .................. | B62D 53/06 280/149.2 |

\* cited by examiner

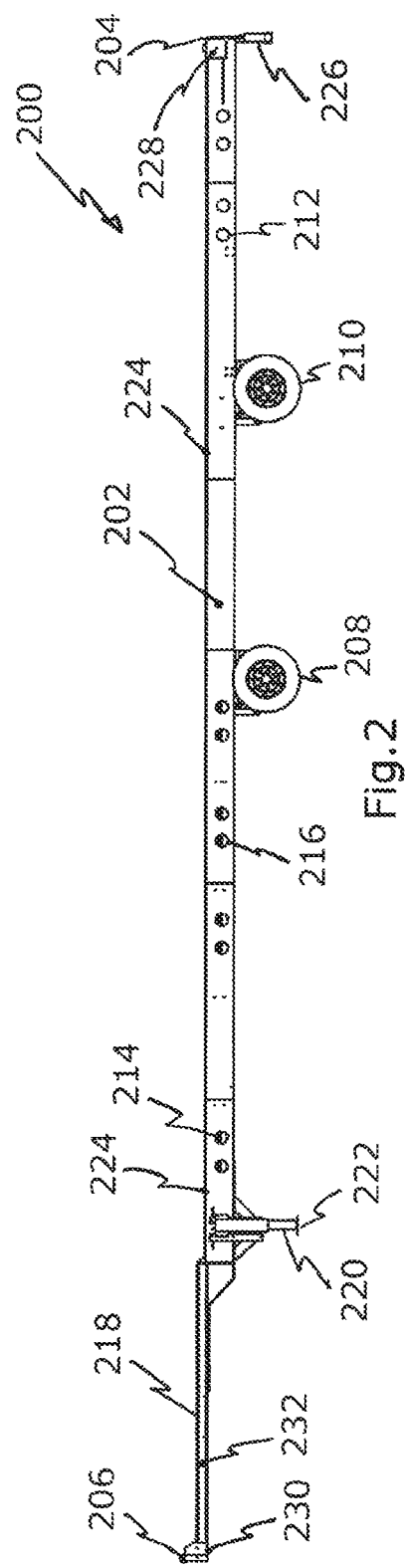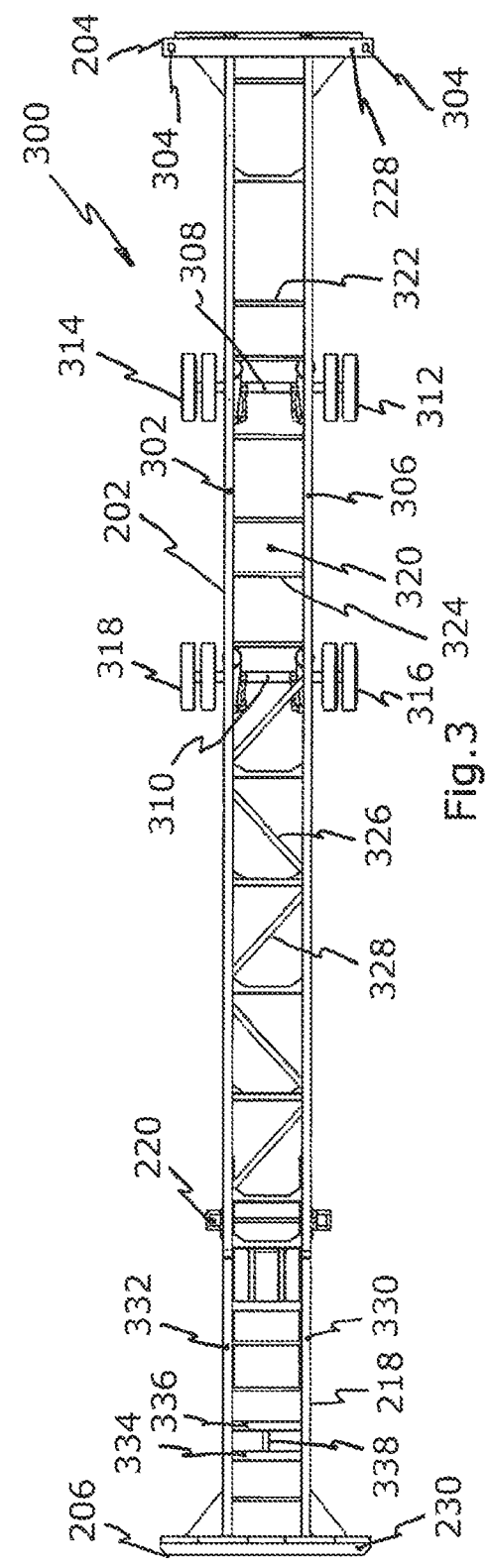

INTERMODAL CHASSIS

CROSS-REFERENCE TO RELATED APPLICATIONS

This application is a continuation of U.S. patent application Ser. No. 14/923,440 filed on Oct. 27, 2015, now U.S. Pat. No. 9,908,453 issued on Mar. 6, 2018, which claims the benefit of U.S. provisional application Ser. No. 62/069,147 filed on Oct. 27, 2014, the entireties of which are incorporated herein by reference.

BACKGROUND OF THE INVENTION

The technical field of the invention pertains generally to intermodal chassis designs, and, more particularly, to improvements in an intermodal chassis especially suited for 53 foot domestic use intermodal containers and that provides for improvements in load capacity and ease of use, while meeting state specific transportation regulations.

Intermodal chassis are semi-trailers used for hauling intermodal shipping containers over the road. Intermodal shipping containers are used for shipping product via road, rail, or ocean. The 53 foot (53') shipping container is also referred to as a "long box" shipping container, or a "high cube" container because it provides expansive capacity with a typical height of (9'6") 114", width of (8'6") 102", and length of 53'. This is 1 foot taller than standard height containers. Another common container length is 48'. International shipments typically utilize intermodal containers that are 6" narrower and typically either 20' or 40' in length.

The 53' intermodal long box container is the most common type of container used for domestic shipping within the United States. The 53' container was constructed and introduced primarily for domestic over-the-road/highway and railroad shipping. 53' containers are typically constructed of 14-gauge (14 Ga) corrugated steel throughout, with 1⅛" thick marine plywood flooring on the interior.

A typical intermodal chassis for a 53' container consists of front and rear bolsters which engage with the lower edges at the front and rear of the container, with a frame extending between and interconnecting the front and rear bolsters, tandem axles positioned toward the rear of the chassis, and a forward portion of the chassis near the front bolster that has a raised surface section sized to fit within a corresponding tunnel depression (3⅛" deep) section on the underside of the container. The typical intermodal chassis is constructed of steel, with a standard leaf spring type suspension, standard sized steel hub wheels (8¼"×22.5" hub), and standard sized tires (11R22.5 tire). The kingpin for connection with the fifth wheel of a towing tractor is typically set back from the rear face of the bolster by 36".

The 53' long box/high cube containers typically require careful loading arrangements to achieve load balancing and distribution between the front nose of the container and locations within the container forward of the chassis tandems, in order to meet particular state highway transportation regulations (or so-called bridge laws). For example, FIG. 1 shows a side view 100 of a typical truck 104 and semi-trailer 102 loading arrangement for meeting California Department of Transportation regulations. The kingpin-to-rear-axle (KPRA) length 108 must not exceed a length of 40 feet. Commercial vehicles may not exceed 80 k lbs GVW. Axle restrictions include a limit of 34 k lbs on the drive tires 112, 34 k lbs on the tandem tires 114, and 12 k lbs on the steer tires 110. To meet these requirements, the typical semi-trailer 102 needs to have cargo 106 arranged to be secured forward of the rear tandems 114, keeping product between the tandem axles 114 and the nose or front of the container. Carriers are advised to load heavier pallets in the nose of the container closer to the tractor cab 104, followed by light pallets and then the lightest pallets rearward, yet still forward of the rear most axle. As shown in FIG. 1, the result is empty (unused/unusable) space in the container aft of the rear tandems 114. Moreover, substantial effort and care is needed to distribute the weight within the container from left side to right side and from the nose of the container space to the rear most position of pallets and product, often using inflatable air bags or other dunnage (not shown) to stabilize separation and spacing of pallets and product. Because loads need to be scaled at the origin of a particular route (to ensure the load is legal for the destination state), considerable care is needed to properly load the cargo 106 into the trailer 102.

What is needed, therefore, are improved intermodal chassis designs that provide for improvements in load capacity, cost of operation, and ease of use, and that adhere to state specific transportation regulations such as those established by the California Department of Transportation that apply to over highway shipping using 53' intermodal containers.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

FIG. 2 is a side view of an improved intermodal chassis that allows for increased loading capacity, according to various preferred embodiments.

FIG. 3 is a top view of the improved intermodal chassis in FIG. 2, according to preferred embodiments.

DESCRIPTION OF PREFERRED EMBODIMENTS

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Although preferred embodiments are presented and described in the context of an improved intermodal chassis design especially suited for 53 foot domestic use intermodal containers, numerous separable inventive aspects are presented that may be used in a wide variety of other over-the-road cargo hauling applications and with the use of a wide variety of other types (and sizes/lengths) of intermodal containers and freight hauling trailers (including 53' length flatbed or other types and lengths of trailers).

The present inventor(s) discovered new, unique, and truly innovative methods, systems, and apparatus for improving an intermodal chassis design especially suited for 53 foot intermodal containers. Various embodiments are illustrated and described in the figures, sketches, details, descriptive materials, and pictures submitted in incorporated by reference herewith. The various embodiments include separable inventive aspects which are separately patentable. The listed inventive aspects are not exhaustive or comprehensive, and further/additional separable inventive aspects are included in the submitted materials but may not be specifically or particularly identified or described in words due to the need to capture (in many instances in detailed illustrations, pictures, or sketches) the many separable inventive aspects in this disclosure.

The present inventors invented an intermodal chassis that allows shippers to ship more freight into and out of the state of California via the railroad using stack train intermodal containers while complying with California vehicle bridge weight limitations. Loads into and out of Nevada are also affected by California bridge laws because the actual rail terminal is in California.

The chassis invented, prototyped, and tested helps shippers with products which occupy most of the cube of a 53 foot intermodal container utilize the entire 53 foot container space without having to cut pallets off at the rear of the container to meet the bridge law restrictions in California. Most shippers with freight weighing 38500 to 43500 lbs and having high cube requirements are the shippers which have to reduce the quantity of pallets loaded in order to meet the bridge laws.

Figure 1:
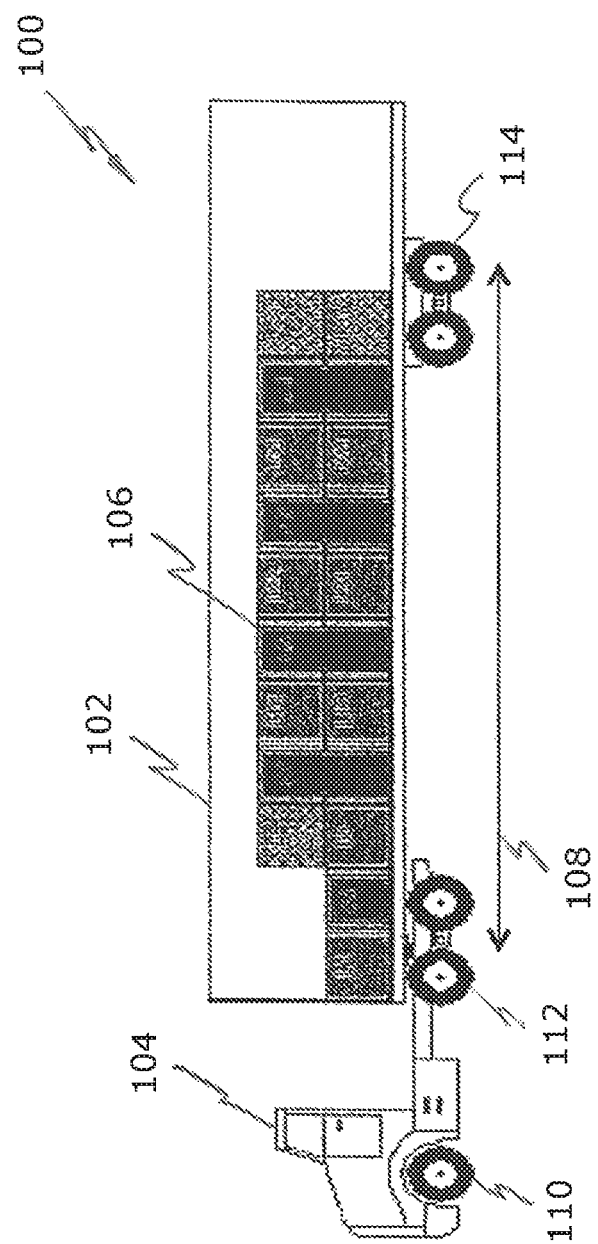
FIG. 1 is a side view showing a typical semi-tractor and trailer loading arrangement for meeting California Department of Transportation regulations.

Dense shippers currently must load loads in a configuration whereby the axles are equalized and airbags or other dunnage are required to secure and spread the load, for example, as shown in FIG. 1. Using the present inventors' chassis reduces dunnage costs and damage by allowing the entire 53 foot container space to be utilized and allowing for more freight to comprise the load before maxing out due to weight.

The present inventors' determined that the directions from major intermodal companies direct shippers as to how to load trailers so that the California bridge law is not violated comprises legalizing the load by configuring the load differently and spreading weight out. High cube shippers, the present inventors' found, are not able to effectively use this measure because the trailer is filled with product. The major intermodal companies limit the maximum gross weight of the load to 43500 lbs. By comparison, the present inventors' improved intermodal chassis designs allow for the container to be loaded to a maximum of 47500 lbs.

As will be described further in the figures, the present inventors discovered numerous improvements that, when combined in preferred embodiments, provide for improved load capacity, lowered cost of operation, and greater ease of use, while solving problems of meeting the bridge law requirements.

The present inventors discovered major improvements in load distribution are achieved by separating the axles so that a forward positioned axle is at least 12 feet forward from the rear most (second) axle instead of using a standard pair of tandem axles. The separation between the axles, it was discovered, spreads the load, and the axles are counted as separate axles as opposed to tandem axles for purposes of calculating bridge loading and in compliance with the California bridge laws.

The present inventors discovered a dramatically lighter weight chassis frame design by strategically cutting circular holes from key portions of the chassis frame structure in areas where the material was not needed to maintain sufficient integrity and strength. The strategically place cutouts, the present inventors discovered, allows better fuel economy, reduced chassis weight, and increased available load weight.

Existing chassis designs use springs and not air bags because lowering a container onto the chassis effectively suddenly loads each of the forward and rear axles with 40,000 pounds, which would break the air bags. The present inventors discovered that bleeding out the air bags so that the frame rests all the way down on the axles such that the only "give" is pressure in the tires, works to avoid blowing out the air bags. To overcome the problems of bursting the air bags of the suspension when loading the container onto the chassis, the present inventors discovered automatically deflating the air bags when the chassis trailer brakes are locked prevented damage to the bags from harm when a container is dropped to quickly.

The present inventors discovered that replacing the standard spring suspension with a deflatable air ride suspension also achieved weight reduction and allows the driver to adjust the height of the container (being hauled on the chassis) to match differing dock heights. The new design provides a load leveling functionality not available in existing intermodal chassis designs. The driver is able to raise the load up to dock level or lower it down, by adjusting the amount of air in the air bags.

The present inventors discovered using smaller wheels, such as 19.5 inch wheels, achieves weight reduction, allows for lower height positioning of the chassis (due to lower axle height), and also reduces theft of chassis tires and wheels because the 19.5 sized wheels do not fit common truck trailers or other chassis.

The present inventors discovered further weight reduction by using aluminum wheels instead of typically used steel wheels. Importantly, reduction of weight at the wheels (as also for weight reductions associated with using air bag suspension instead of springs) provides for higher gross payload overall and weight latitude on specific axles.

The present inventors discovered that using air bags in the suspension allows for self-scaling and distribution of weight longitudinally to adjust weight over a given axle. Previously, the container would be loaded using best guessing, and the drive would hope it's legal until the driver is able to stop at a public scale. The risk is getting stopped with an improperly distributed load. Shippers do not typically have their own scales, so there are few ways to avoid this risk. With self-scalers integral to the chassis, which employ the air bags with hydraulics, the problem is addressed. The present inventors discovered that providing for the chassis to be self-scaling enables the driver to determine whether a load is leaving the yard in a legal fashion without going to a public scale, thus reducing the costs of scaling and potentially expensive highway fines for improperly balanced or overloaded conditions.

The present inventors discovered that adjustments in the location of the kingpin on the chassis from a standard 36" aft of the rear face of the front bolster to positions incrementally rearward toward a position at 48" aft of the rear face of the front bolster allows for more load to be placed in the nose of the container, thereby over the drive axles and increasing weight on the tractor.

The present inventors discovered using Teflon plates instead of the typical steel with grease applied, achieves cost savings in maintenance and reduces overall wear and tear. In one embodiment, the pickup plate is coated with a non-stick, self-lubricating material, and grease or other lubricants are unnecessary.

The present inventors discovered incorporating LED lighting reduces power consumption, improves lamp life, and improves safety characteristics of the chassis since LED lights are brighter, require less power, and last many times longer than the standard incandescent bulbs used on existing intermodal chassis designs.

FIG. 2 is a side view 200 of an improved intermodal chassis 202 that allows for increased loading capacity, according to various preferred embodiments. The left side or driver side of the chassis 202 is shown, with a front bolster 230 at a forward end and a rear bolster 228 (and rear bumper 226 therebelow) at a rearward or rear most end of the chassis, the two bolsters longitudinally interconnected by frame structure comprising a gooseneck portion 232 with a top surface 218 extending rearward from the front bolster 230, and a main frame stepped down top surface portion 224 extending from the gooseneck portion 232 rearward to and including the rear bolster 228. The raised gooseneck top surface 218 is preferably sized to fit within the corresponding depression or tunnel formed in the lower surfaces of the nose/front of a standard intermodal container. In one embodiment, the gooseneck top surface 218 is offset from the main frame top surface 224 by 3⅛". The length (206 to 204) between the front of the chassis 206 and the rear end 204 of the rear bolter 228 is preferably 53' 8⅞".

Just aft or rear of a transition from the gooseneck top surface 218 to the main frame top surface 224 is an extendable jack stand or landing gear 220, with sand shoes 22 for ground contact. Extending rearward are preferably two axle/wheel/tire assemblies—a forward trailer axle/wheels/tires assembly 208 and, separated rearward, a rear trailer axle/wheels/tires assembly 210. In preferred embodiments, the vertically extendable landing gear 220 comprise a pair of sand shoes 222, and each of the axle/wheels/tires assemblies 208 and 210 comprise an axle with wheels and tires. In preferred embodiments, the wheels comprise aluminum hubs and are smaller sized than standard semi trailer wheels, preferably comprising 19.5 inch wheels to provide a lower axle to ground height, thus allowing the chassis to be lowered to a lower height, and to provide weight reduction. The ground-to-main frame top surface 224 height is preferably nominally 48" in normal operating conditions.

Several holes 214, 216, 212 are preferably strategically cut within the sides of the main frame for weight reduction, preferably similarly sized (for example, each having a diameter of 5") and arranged in pairs, with twelve (12) holes in each main (I-beam) side, as shown.

FIG. 3 is a top view 300 of the improved intermodal chassis 202 in FIG. 2, according to preferred embodiments. In preferred embodiments, the center of the forward axle 310 and the center of the rear axle 308 are separated by at least twelve (12) feet so that each axle is considered a separate axle. In one embodiment the spread between the center of the forward axle 310 and the center of the rear axle 308 is 12'1" (twelve feet, one inch). In preferred embodiments, the distance between the center of the kingpin (not shown) and the center of the rear axle 308 is just under 40' to comply with state regulations. In one embodiment, the kingpin mount 338 is 40.25" from the rear surface of the front bolster 230, and the position of the rear axle 308 is set to be just under the 40' kingpin-to-rear-axle (KPRA) limit. In other embodiments, the kingpin mount 338 may be positioned rearward from between 36" toward 48" aft of the rear surface of the front bolster 230, with an increasingly rearward mounting position putting more weight on the tractor drive tires.

The front or gooseneck portion 232 of the chassis 202 preferably comprises gooseneck I-beams 332 and 330 arranged in parallel and interconnected to one another by cross members such as gooseneck (tubular) cross members 334 and 336. The gooseneck I-beams 332 and 330 extend rearward from the front bolster 230 and transition to main I-beams 302 and 306 comprising a main frame portion of the chassis 202, with the main I-beams 302 and 306 extending rearward from the gooseneck portion 232 past the landing gear 220, front and rear axles 310 and 308, respectively, and ending at the rear bolster 228. Various cross members such as (tubular) cross members 324, 322 and diagonal (C-channel) cross members 328, 326 (and other cross members not numbered) interconnect the main I-beams 302 and 306, which, as shown in FIG. 3, are parallel to one another and longitudinally aligned with the gooseneck I-beams 332 and 330. In preferred embodiments, five (5) diagonal cross members such as 328 and 326 provide bracing in five (5) bays along the main frame between the landing gear 220 and forward and rear axles.

In preferred embodiments, air lines and electrical wires (not shown) are routed along the length of the chassis 202, and at least one air tank (not shown) is mounted (such as in the location marked 320) for operation of air bags associated with the suspension for each of the axles 310 and 308 and corresponding wheels and tires—right (passenger) side forward tires 318, left (driver) side forward tires 316, right (passenger) side rear tires 314, and left (driver) side rear tires 312. Although each axle 310 and 308 is shown with a set of four (4) wheels/tires, further weight reduction may be achieved using two (2) double (or fat) wheels/tires for each axle. For example, one double wheel/tire may be used in place of the right side forward pair of tires 318, that are configured and sized to provide similar ground contact and other characteristics, and likewise for the pairs of tires 316, 314, and 312.

In preferred embodiments, the width of the rear bolster 228 from left (driver) side to right (passenger) side is 96¾" and the width of the bumper 226 from left side to right side is 88¾". The outward ends of the top surface of the rear bolster 228 preferably comprises attachment points or (ISO) twist locks 304 to securely fasten with correspondingly formed corner castings of a standard intermodal container.

Figure 4:
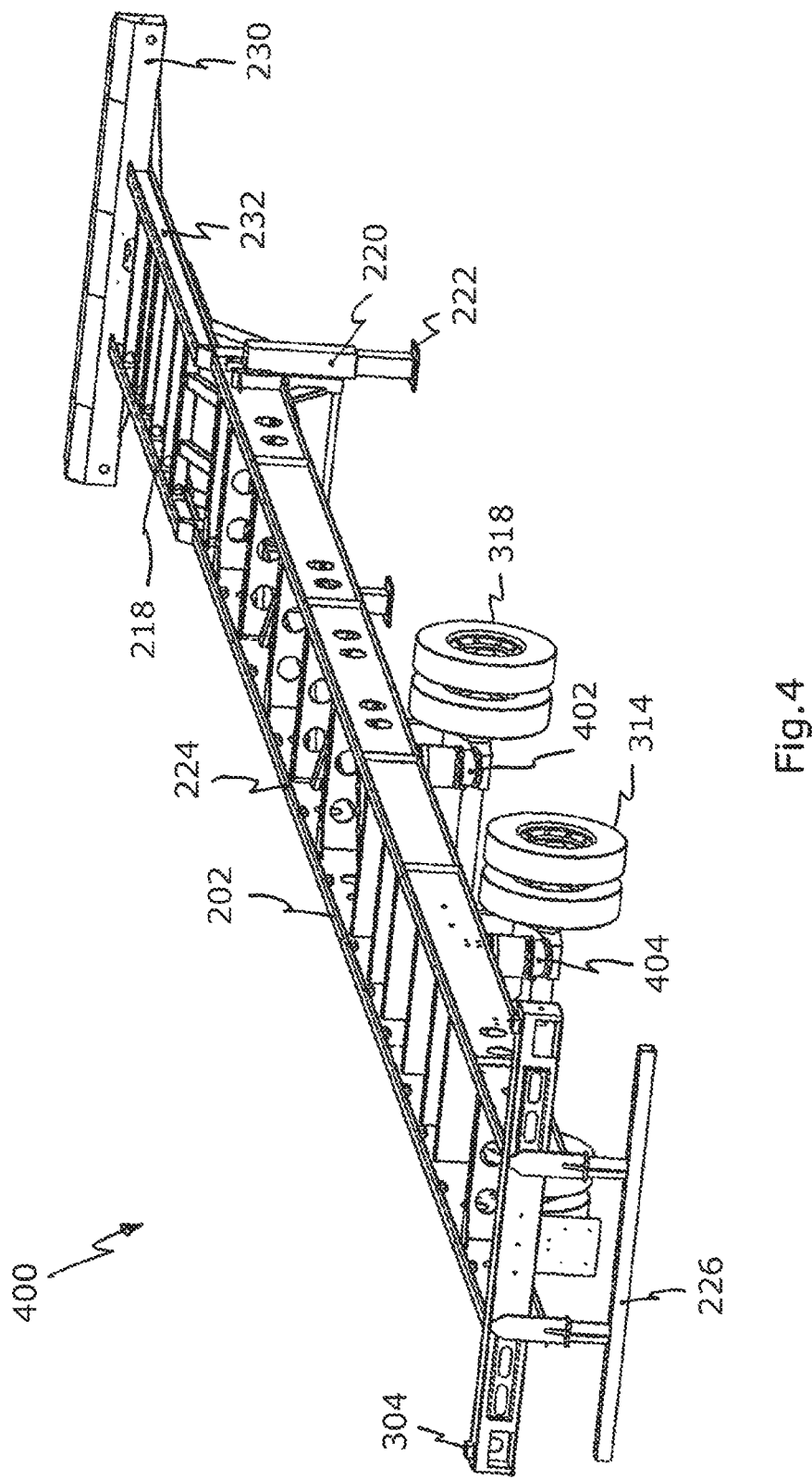
FIG. 4 is a perspective view of the improved intermodal chassis in FIGS. 2 and 3 as viewed from above and the rear and passenger side, according to preferred embodiments.

FIG. 4 is a perspective view 400 of the improved intermodal chassis 202 in FIGS. 2 and 3 as viewed from above and the rear and passenger side, according to preferred embodiments. As shown, air bags 402, 404 are preferably used for suspension instead of typically used leaf spring suspension systems. In preferred embodiments, the air bags are deflated to prevent damage to the air bags when a container is loaded onto the chassis 202. Preferably, the air bags automatically deflate when the chassis brakes are locked. In various embodiments, the driver/operator may adjust the amount of air in the air bags to adjust the level of the container for loading and unloading of the container at, for example, dock surfaces that may vary in height, and the amount of air in the air bags may be adjusted to level the chassis for transport. The air bags are preferably integrated into a self-scaling systems whereby the amount of air in the air bags, the pressure within the air bags, and/or measures of position and degree of inflation are used for determination of load weight over each of the forward and rear axles.

In preferred embodiments, the front bolster 230 comprises formed 10 Ga 1020 steel sheet metal, the rear bolster 228 comprises 7 Ga wall 1020 steel 8" square tube, the rear bumper 226 comprises horizontal 3" by 4" 7 Ga wall 1020 steel tube and vertical ¼" wall 1020 steel 3" square tube, the main I-beams 302, 306 comprise 0.24" thick 1020 steel 11.8" tall 4" flats (top and bottom), the gooseneck I-beams 330, 332 comprise 0.25" thick 1020 steel 4.25" tall 4.25" flats (top and bottom), the cross members comprising 1020 steel tube or formed sheet. In preferred embodiments, the chassis I-beams, cross members, bolsters, and other reinforcements, bracing, and brackets are welded together and then painted. In one embodiment, an experimental use prototype was constructed by the present inventors—having substantially the characteristics shown in FIG. 4, including smaller aluminum wheels, air bag system, forward and rear axles spread apart at least twelve feet, and 5" diameter holes cut in the main I-beams and cross members as shown—with an unladen weight (as licensed/registered with California) at 2915 lbs.

Figure 5:
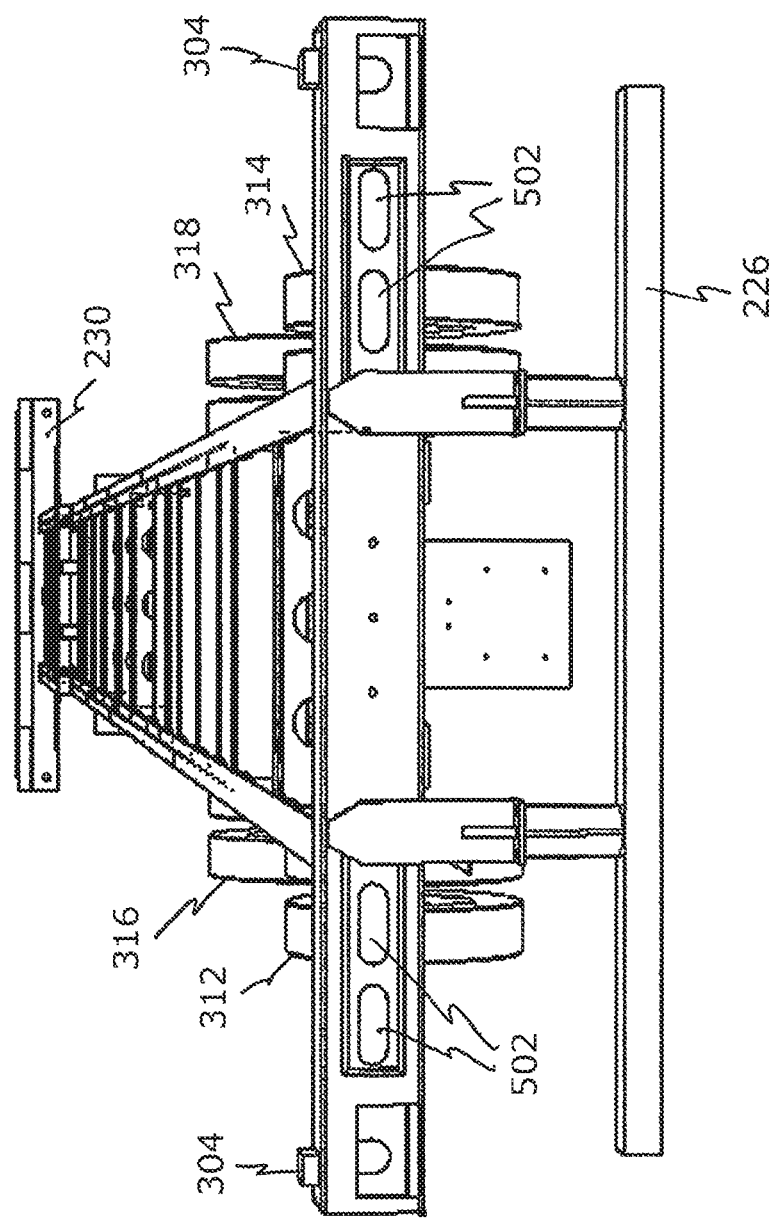
FIG. 5 is a perspective view of the improved intermodal chassis in FIG. 4 as viewed from above and the rear looking toward the front of the chassis, according to preferred embodiments.

FIG. 5 is a perspective view of the improved intermodal chassis 202 in FIG. 4 as viewed from above and the rear looking toward the front of the chassis, according to preferred embodiments. The chassis 202 preferably incorporates LED lighting 502 within the rear bolster 228 between twist lock 304 locations.

Figure 6:
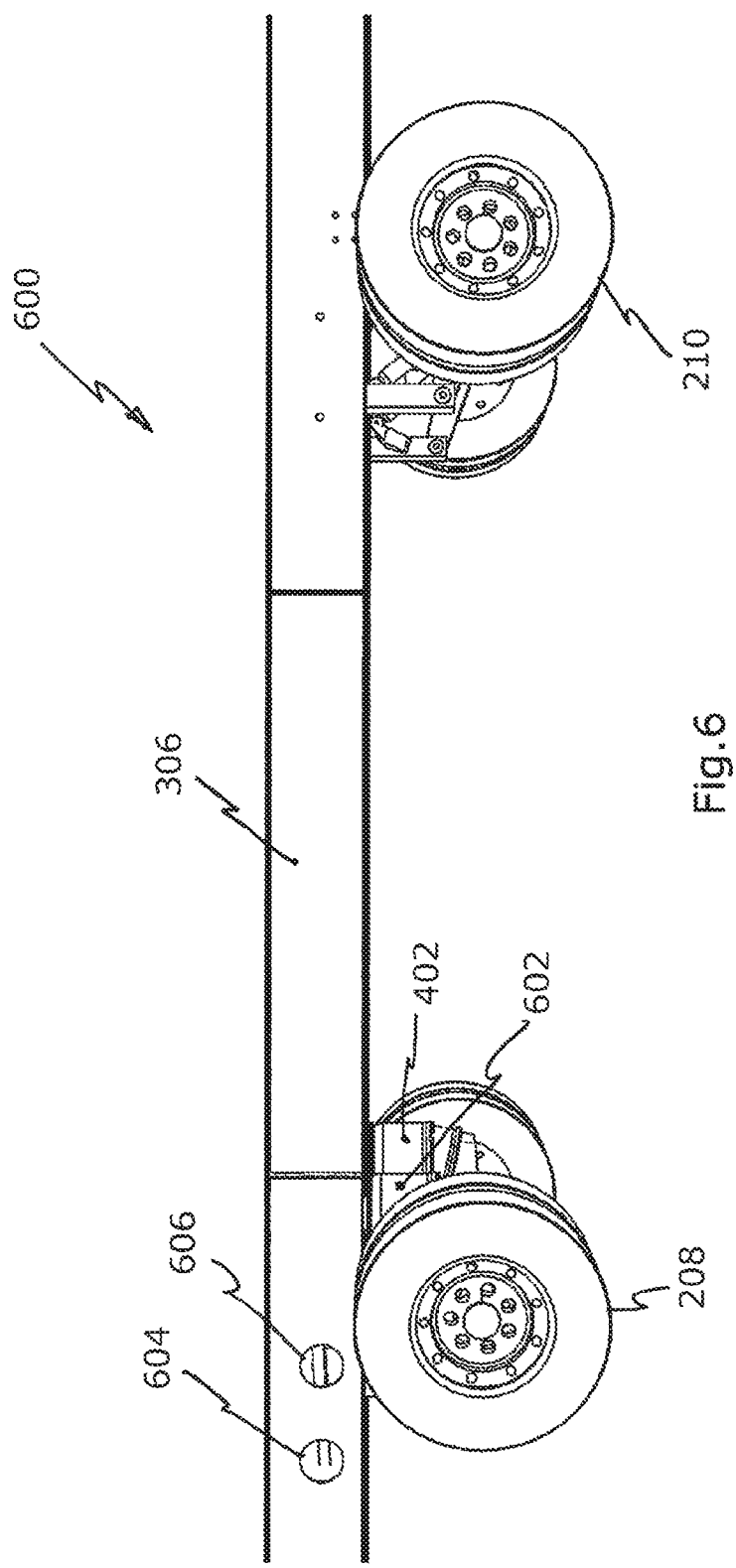
FIG. 6 is a side perspective view of an axle portion of the improved intermodal chassis in FIG. 4 as viewed from the driver side, according to preferred embodiments.
Figure 7:
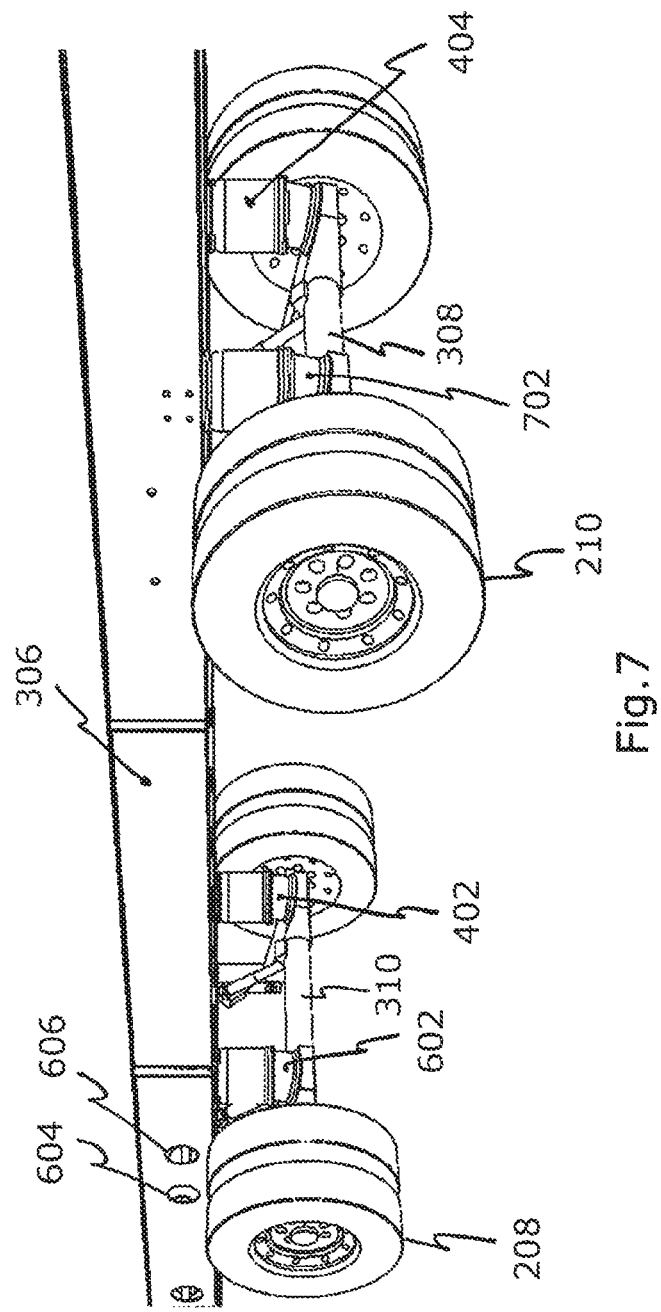
FIG. 7 is a side perspective view of the axle portion shown in FIG. 6 as viewed from the rear and driver side, according to preferred embodiments.

FIG. 6 is a side perspective view of an axle portion 600 of the improved intermodal chassis 202 in FIG. 4 as viewed from the driver side, according to preferred embodiments. And FIG. 7 is a side perspective view of the axle portion shown in FIG. 6 as viewed from the rear and driver side, according to preferred embodiments. FIGS. 6 and 7 more clearly show the separate forward axle 310 and rear axle 308, and the air bags associated with each—right rear air bag 404 and left rear air bag 702, for rear axle 308; and right forward air bag 402 and left forward air bag 602, for forward axle 310. Also depicted more clearly are holes 604 and 606 in the left side main I-beam 306, which preferably comprise 5" diameter cut outs arranged as shown.

Figure 8:
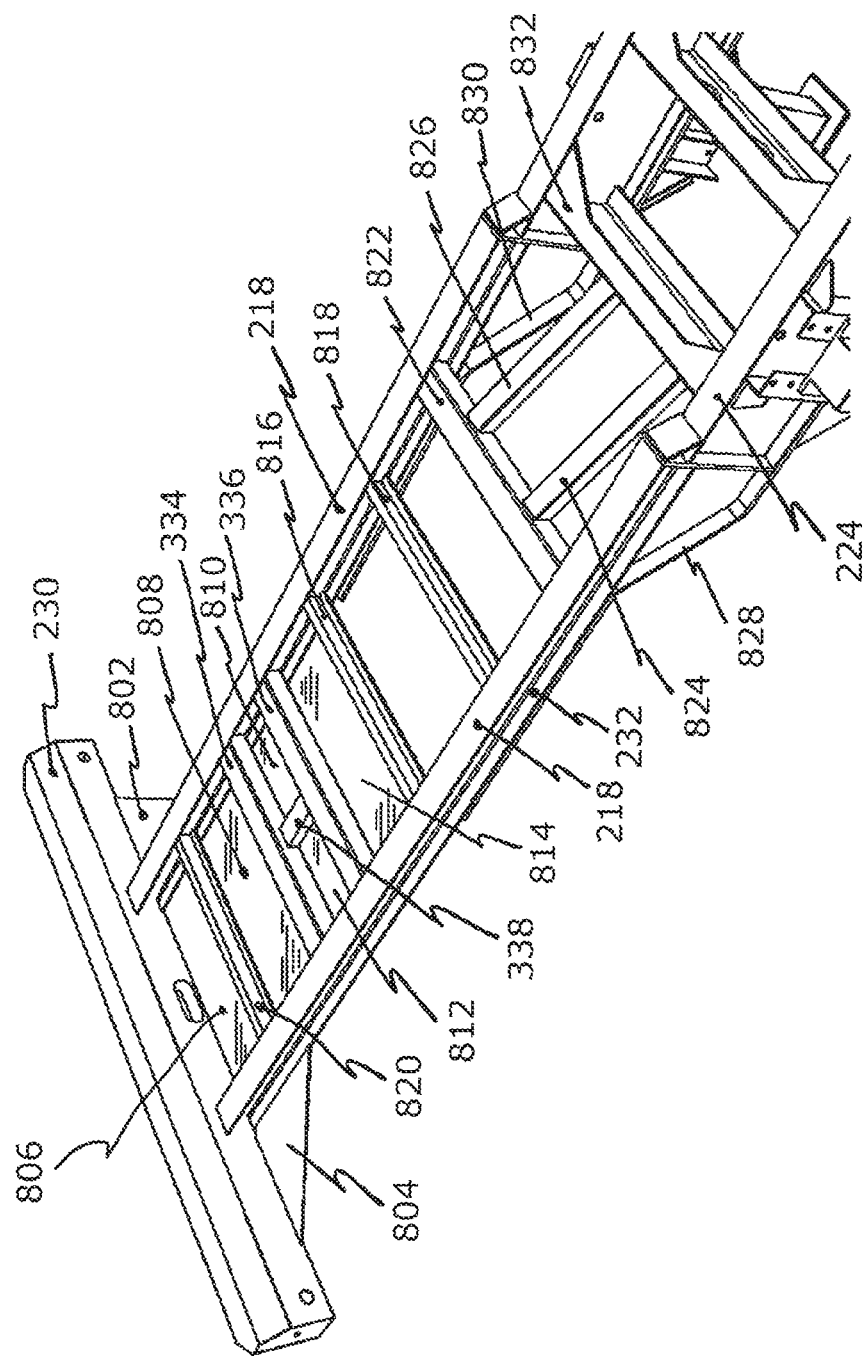
FIG. 8 is a perspective view of a gooseneck portion of the improved intermodal chassis in FIG. 4 as viewed from above and the rear and driver side looking forward toward the front of the chassis, according to preferred embodiments.

FIG. 8 is a perspective view of a gooseneck portion of the improved intermodal chassis in FIG. 4 as viewed from above and the rear and driver side looking forward toward the front of the chassis, according to preferred embodiments. From the front bolster 230 extending rearward and covering the lower surfaces under and between the gooseneck I-beams 232, a pickup plate preferably fills the spaces 806, 808, 810, 812, and 814 between the front bolster 230 and transverse channel 820, between transverse channel 820 and gooseneck tube 334, between gooseneck tube 334 and gooseneck tube 336, and between gooseneck tube 336 and transverse channel 816. Kingpin mounting 338 is preferably welded between gooseneck tubes 336 and 334, as shown. Wing plates 802 and 804 stiffen the outer ends of the front bolster 230. Three (3) transverse channel cross members 820, 816, and 818, along with three (3) gooseneck tube cross members 334, 336, and 822 interconnect the right and left gooseneck I-beams that provide the gooseneck top surface 218. Gooseneck transition tubes 824 and 826 angle downward to the forward face of a gusset 832 that forms a bulkhead and start/forward most portion of the frame structure providing the main frame top surface 224 that extends rearward all the way to the rear bolster 228. Formed flat bar transitions 828 and 830 (with welded insert panels, not numbered) provide a transition from the gooseneck I-beams 232 to the main frame I-beams 302, 306.

In preferred embodiments, the pickup plate (806, 808, 810, 812, 814) comprises one piece of sheet metal, smooth on its lower surface, exposing the kingpin mounted thereon, the kingpin extending downward from the pickup plate for engagement with the receiver of a semi-tractor when the chassis is to be towed. The wing plates 804 and 802 preferably comprise ¼" thick 1020 steel. The front bolster 230 preferably comprises formed 10 Ga 1020 steel sheet metal. The kingpin mount 338 preferably comprises C-channel opened downward. The transverse channels 820, 816, and 818 each preferably comprise C-channel opening rearward. The gooseneck tube cross members 334, 336, and 822 each preferably comprise 3" by 4" 1020 steel rectangular tube with 0.25" thick wall material. The gooseneck I-beams 330 and 332 (also referenced as 232) preferably comprise 0.25" wall 1020 steel 4.25" tall with 4.25" top and bottom flats. The formed flat bar transitions 828 and 830 preferably comprise 5" wide 1020 steel bar stock.

Figure 9:
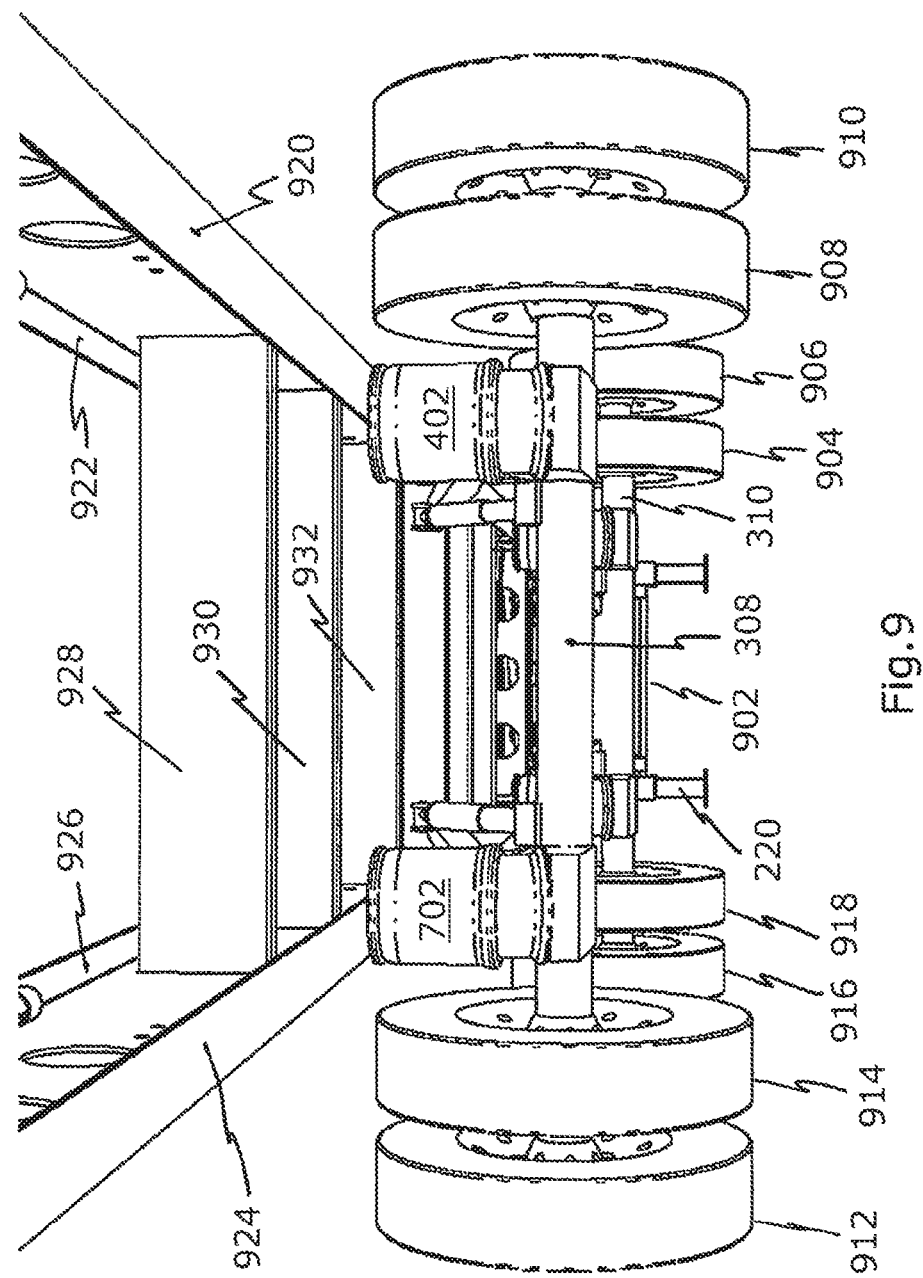
FIG. 9 is a perspective view of an axle portion of the improved intermodal chassis in FIG. 4 as viewed from below and rear, according to preferred embodiments.

FIG. 9 is a perspective view of an axle portion of the improved intermodal chassis 202 in FIG. 4 as viewed from below and rear, according to preferred embodiments. As shown, the forward part of the chassis includes a cross support 902 between the non-extendable tubes of the landing gear 220. In preferred embodiments, the chassis 202 comprises eight (8) wheels and tires, a pair of wheels and tires on the each end of each axle. As shown, the forward axle 310 has an inner right forward tire 904, an outer right forward tire 906, an inner left forward tire 918, and an outer left forward tire 916. The rear axle 308 has an inner right rear tire 908, an outer right rear tire 910, an inner left rear tire 914, and an outer left rear tire 912.

FIG. 9 also shows the main frame I-beams in more detail. The right side I-beam is shown with (the underside of) a bottom flat 920 and (the underside of) a top flat 922. The left side I-beam is shown with a bottom flat 924 and a top flat 926. Preferably the I-beam comprises 11.8" tall 0.24" thick 1020 steel with the top and bottom flats being 4" wide. The cross members 928, 930, and 932 shown interconnecting the right and left I-beams to form the main frame, preferably comprise 8" tall by 2" longitudinally along the frame by 0.25" thick 1020 steel rectangular tube.

Figure 10:
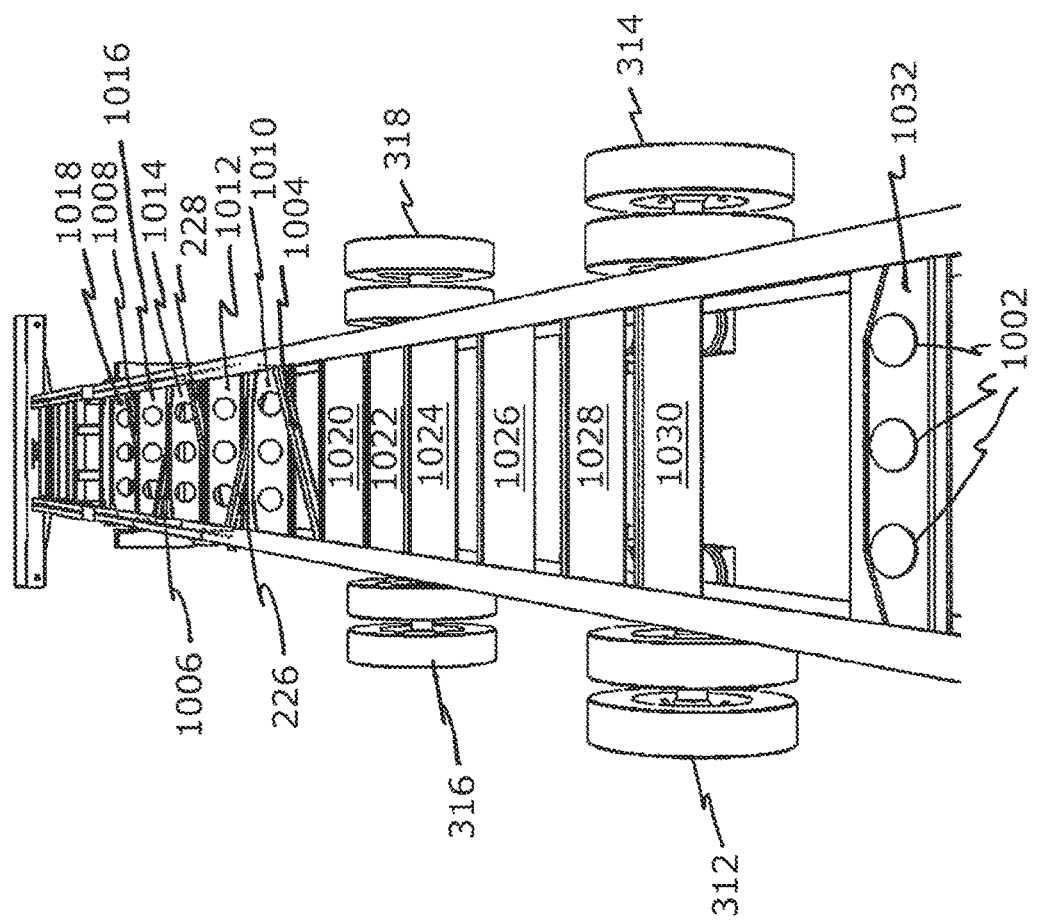
FIG. 10 is a perspective view of a forward portion of the improved intermodal chassis in FIG. 4 as viewed from above and rear looking forward toward the front of the chassis, according to preferred embodiments.

FIG. 10 is a perspective view of a forward portion of the improved intermodal chassis 202 in FIG. 4 as viewed from above and rear looking forward toward the front of the chassis, according to preferred embodiments. The chassis 202 preferably comprises six (6) cross members welded to and interconnecting the two main frame I-beams that are formed and configured the same as the C-channel shaped cross member 1032. The formed cross member 1023 preferably has three (3) cut outs 1002, each measuring 5" in diameter, and each comprises 0.375" thick 1020 steel sheet metal formed to have a height of 9", lower longitudinal width of 3", and an upper longitudinal width (at its right and left sides, where the cross member is welded to the inside surfaces of the main frame I-beams) of 7.5". The three (3) five (5) inch holes are preferably equally spaced from left to right, as shown. And the open part of the formed "C" channel is directed rearward. Each of six (6) similarly formed cross members are preferably oriented in a similar way, including cross members 1032, 1010, 1012, 1014, 1016, and 1018 (referencing the cross members from the rear of the chassis moving forward). The bulkhead gusset 832 shown in FIG. 8 is preferably formed to be similar to each of the six (6) formed cross members 1032, 1010, 1012, 1014, 1016, and 1018 except without the three (3) cutouts. Preferably, each of the cross members 1030, 1028, 1026, 1024, 1022, and 1020 comprise the same construction as described for rectangular tube cross members 928, 930, and 932 in FIG. 9. As shown in FIG. 3, one more cross member is shown between the formed cross member 1032 and the rear bolster 228, and this cross member is preferably constructed to be similar to the other rectangular tube type cross members 1030, 1028, 1026, 1024, 1022, and 1020. Therefore, in preferred embodiments, there are seven (7) rectangular tube cross members and seven (7) formed cross members interconnecting the right main I-beam 302 and the left main I-beam 306.

Preferably, the five (5) diagonal cross supports 1004, 326, 328, 1006, and 1008 comprise C-channel 0.25" thick 1020 steel, 3" wide by 1.5" tall, with the open end directed downward. A side view as in FIG. 2 would show each diagonal cross support as having a height of 1.5". A top view as in FIG. 3 would show the width of each diagonal being 3".

Figure 11:
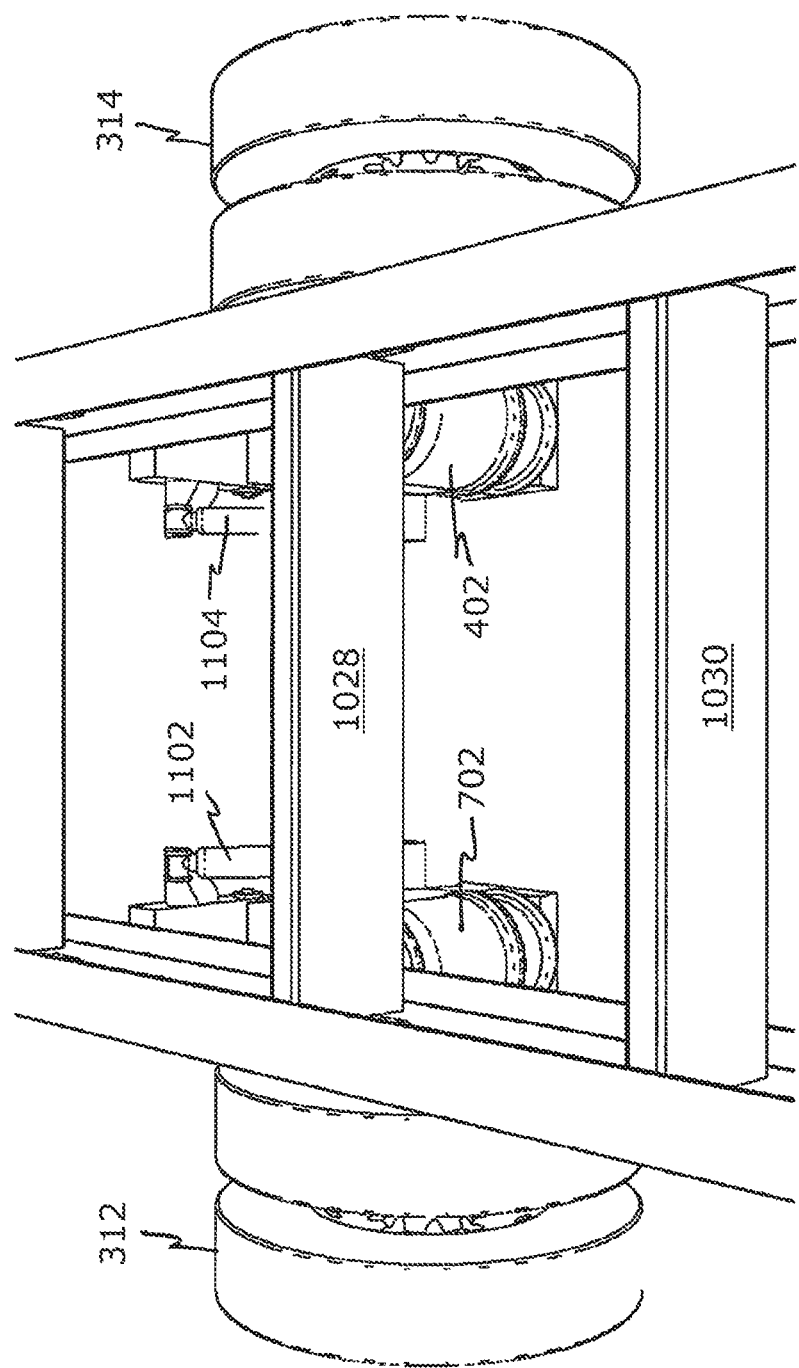
FIG. 11 is a perspective view of an axle portion of the improved intermodal chassis in FIG. 4 as viewed from above and rear, according to preferred embodiments.

FIG. 11 is a perspective view of an axle portion of the improved intermodal chassis in FIG. 4 as viewed from above and rear, according to preferred embodiments, and shows more clearly a relative positioning of right and left rear shock absorbers 1104 and 1102, respectively. A similar shock absorber is configured for each of the four (4) air bags, as shown also in FIGS. 6, 7, and 9.

Figure 12:
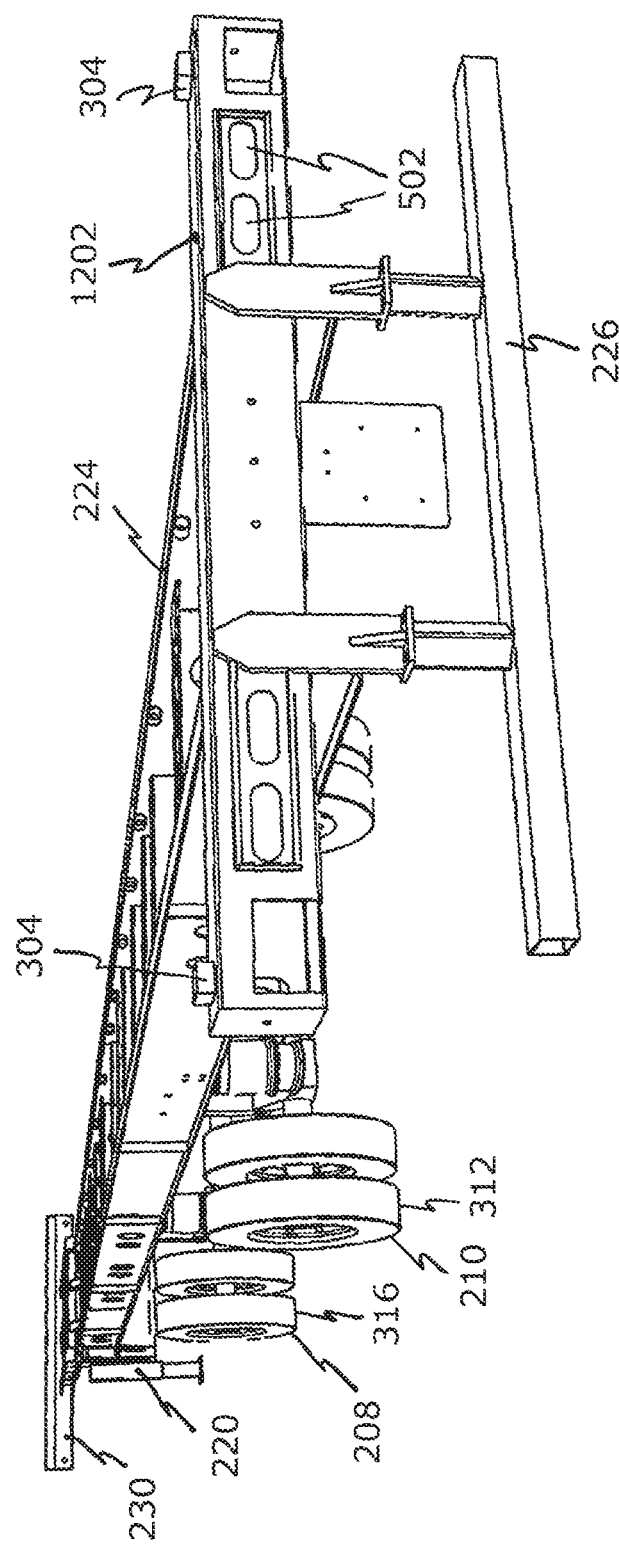
FIG. 12 is a perspective view of the improved intermodal chassis in FIG. 4 as viewed from above and the rear and driver side, according to preferred embodiments.

FIG. 12 is a perspective view of the improved intermodal chassis in FIG. 4 as viewed from above and the rear and driver side, according to preferred embodiments, and shows the chassis 202 from the opposite side and at less of a downward angle than illustrated in FIG. 4.

Figure 13:
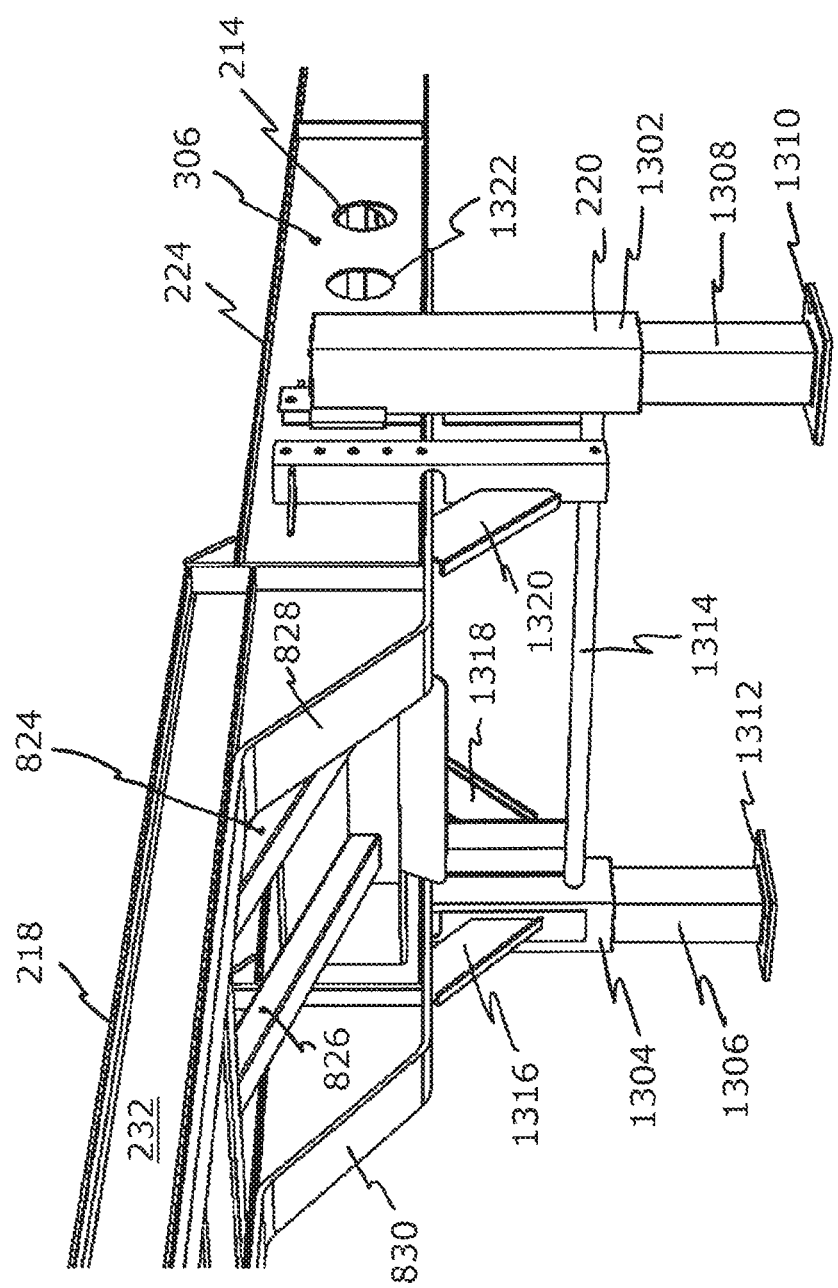
FIG. 13 is a perspective view of a landing gear portion of the improved intermodal chassis in FIG. 4 as viewed from below and the front and driver side looking rearward toward the back of the chassis, according to preferred embodiments.

FIG. 13 is a perspective view of a landing gear portion of the improved intermodal chassis in FIG. 4 as viewed from below and the front and driver side looking rearward toward the back of the chassis, according to preferred embodiments. Preferably, holes 1322 and 214 are cut in the sides of the main I-beam 306 just aft of the landing gear 1302. The holes 1322 and 214 preferably are 5" diameter cutouts and are similarly sized as the other cutouts shown along main I-beams 306 and 302. The landing gear 220 preferably comprises non-extendable tubes 1302 and 1304 from which telescopic members 1308 and 1306 may extend, each capped by a sand shoe 1310, 1312. Stabilizer bracing 1316, 1318, and 1320 and a lateral cross support 1314 are preferably used to further stiffen and support the landing gear 220.

Figure 14:
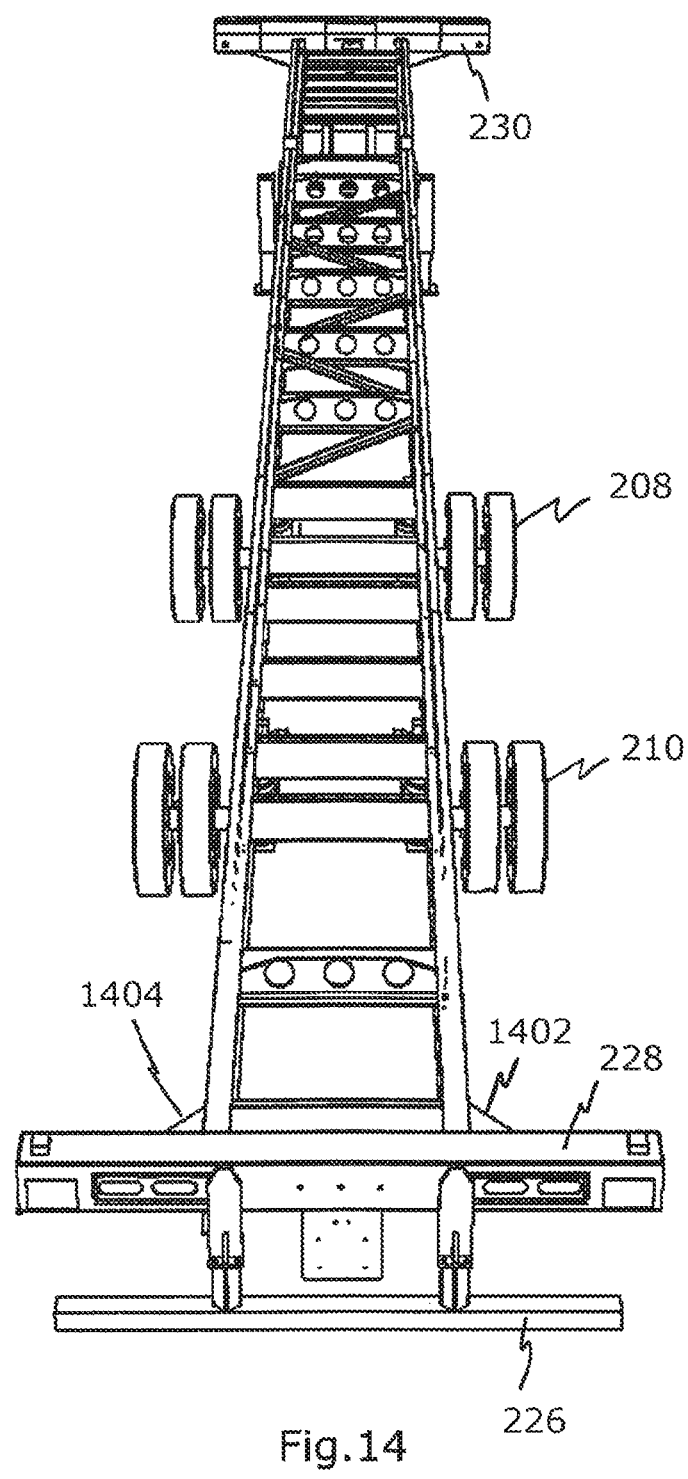
FIG. 14 is a perspective view of the improved intermodal chassis in FIG. 4 as viewed from above and the rear looking toward the front of the chassis, according to preferred embodiments.

FIG. 14 is a perspective view of the improved intermodal chassis in FIG. 4 as viewed from above and the rear looking toward the front of the chassis, according to preferred embodiments. As shown from this angle, the wing plates 1402 and 1404 between the main I-beam outward sides and the rear bolster 228 are visible.

Figure 15:
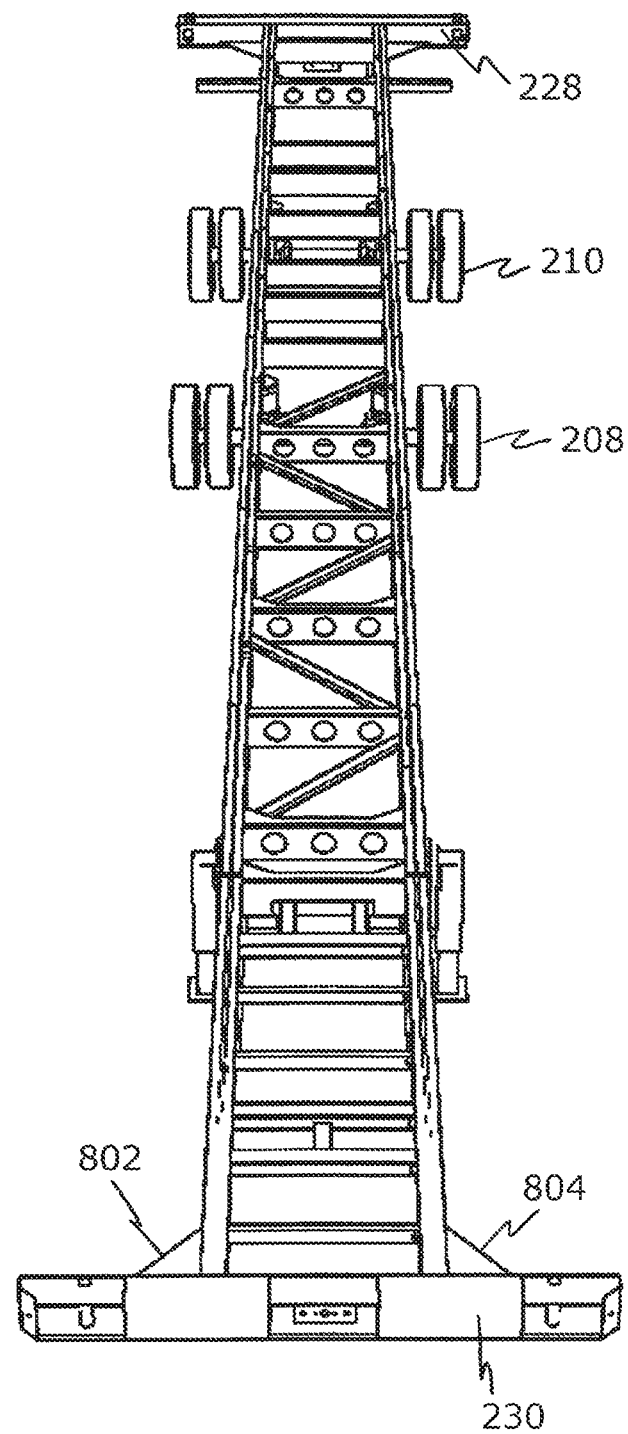
FIG. 15 is a perspective view of the improved intermodal chassis in FIG. 4 as viewed from above and the front looking toward the back of the chassis, according to preferred embodiments.

FIG. 15 is a perspective view of the improved intermodal chassis in FIG. 4 as viewed from above and the front looking toward the back of the chassis, according to preferred embodiments. FIG. 15 more clearly shows the arrangement of cross members interconnecting the right and left I-beams. Six (6) cross members comprise the gooseneck portion— three (3) transvers channel and three (3) gooseneck tube. Fourteen (14) cross members comprise the main frame portion—one bulkhead cross member at the gooseneck-to-main frame transition, followed by five (5) formed cross members with holes, followed by six (6) rectangular tube type cross members, followed by a sixth formed cross member with holes, and lastly a seventh rectangular tube cross member.

Figure 16:
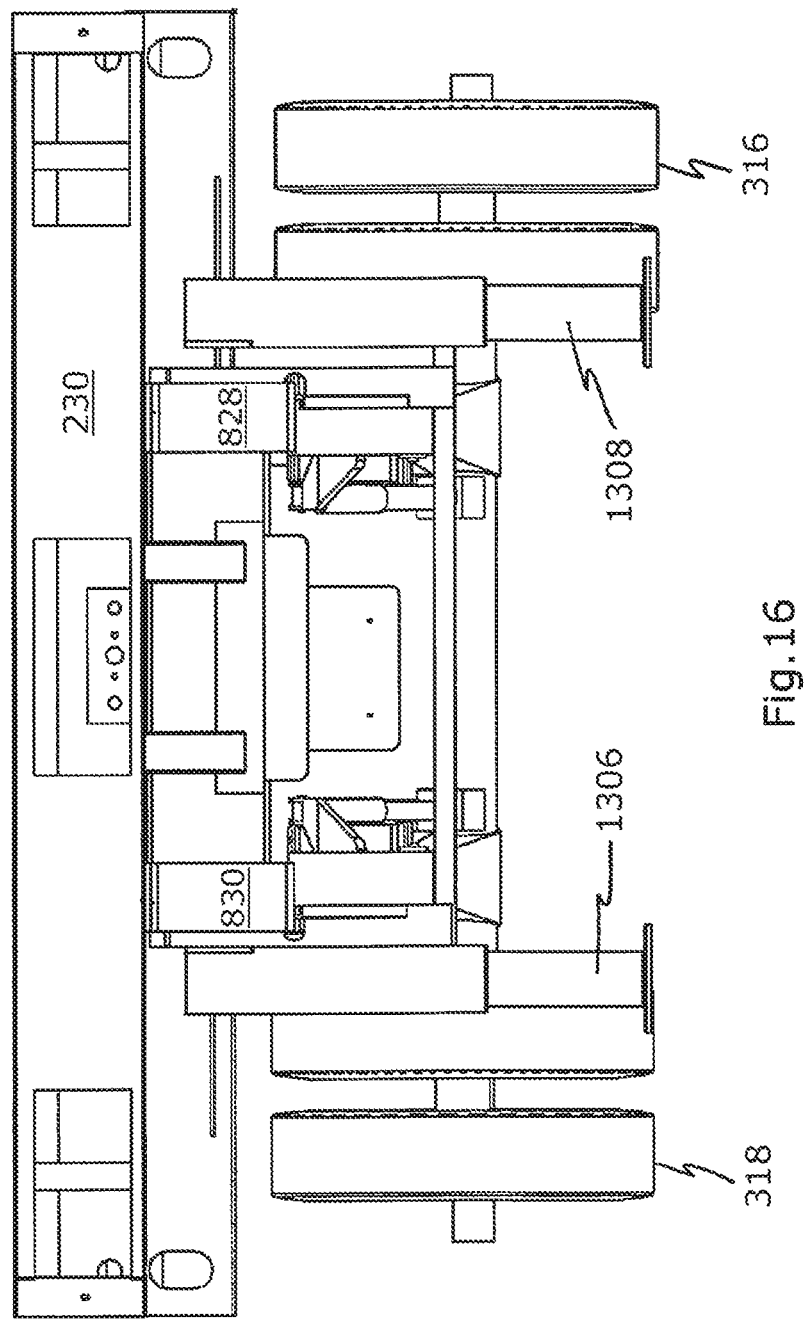
FIG. 16 is a front elevation view the improved intermodal chassis in FIG. 4, according to preferred embodiments.
Figure 17:
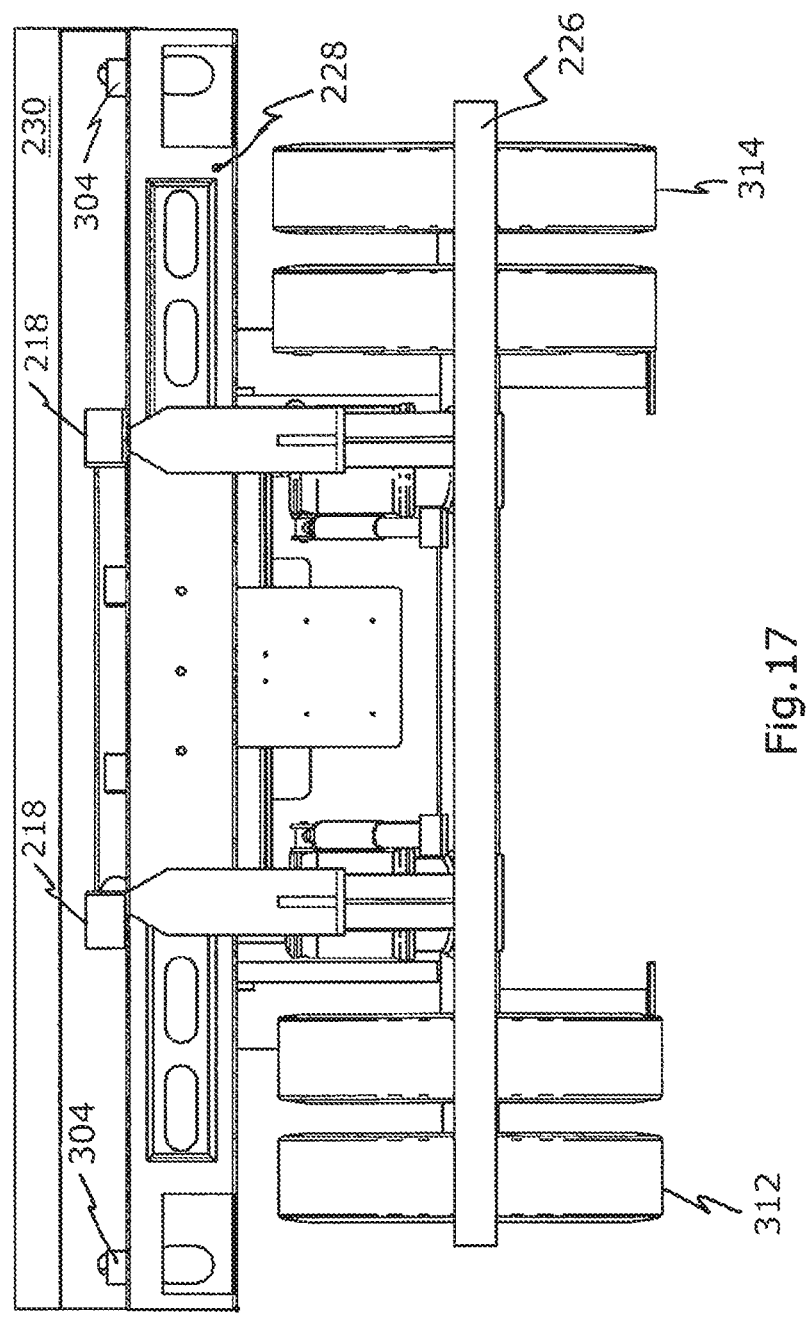
FIG. 17 is a rear elevation view the improved intermodal chassis in FIG. 4, according to preferred embodiments.

FIG. 16 is a front elevation view the improved intermodal chassis in FIG. 4, according to preferred embodiments. FIG. 17 is a rear elevation view the improved intermodal chassis in FIG. 4, according to preferred embodiments.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An intermodal chassis adapted for carrying a 53 foot shipping container that is loaded with cargo along its entire 53 foot length, for over-the-highway transport, the chassis comprising:
    a front bolster and a rear bolster, with a frame structure extending longitudinally therebetween and sized to carry said 53 foot shipping container;
    a gooseneck portion of said frame structure extending longitudinally rearward from said front bolster and having a top surface sized to fit within a tunnel depression of said shipping container;
    a kingpin mounted on a bottom surface of said gooseneck portion at a position between 36 inches and 48 inches rearward of a rear face of said front bolster;

a main portion of said frame structure extending longitudinally rearward from said gooseneck portion and interconnecting with said rear bolster;

a rear axle positioned longitudinally under said main portion of said frame structure such that a kingpin-to-rear-axle length is no more than 40 feet; and a forward axle positioned longitudinally under said main portion of said frame structure between said gooseneck portion and said rear axle such that a forward-to-rear-axle length is at least 12 feet, the combination of said kingpin position, said kingpin-to-rear-axle length, and said forward-to-rear-axle length allowing said chassis to carry said 53 foot shipping container with said container loaded with cargo along its entire 53 foot length and free from reducing cargo weight positioned rearward of said rear-axle.

2. The chassis of claim 1 further comprising air bag suspension for said forward and rear axles, with the air bags for each axle adapted to automatically deflate when a chassis brake system is locked, thereby protecting said air bags from damage when loading said container onto said chassis.

3. The chassis of claim 2 further comprising a self-scaling system and a load-leveling system associated with said air bags.

4. The chassis of claim 1 further comprising multiple holes cut from said frame structure to reduce the weight of said chassis.

5. The chassis of claim 1 further comprising only 19.5 inch wheels to reduce the height of said forward and rear axles and to reduce the weight of said chassis.

6. The chassis of claim 5 wherein said wheels comprise aluminum instead of steel to reduce the weight of said chassis.

7. The chassis of claim 1 further comprising non-stick, self-lubricating material on said bottom surface of said gooseneck portion proximate to said kingpin.

8. The chassis of claim 1 further comprising LED lights integrated into a rear facing surface of said rear bolster.

\* \* \* \* \*